US012580976B1

(12) United States Patent
Lueth et al.

(10) Patent No.: US 12,580,976 B1
(45) Date of Patent: *Mar. 17, 2026

(54) SYSTEM AND METHOD FOR PROVIDING A REAL-TIME DIGITAL VIRTUAL AUDIENCE

(71) Applicants:Jacquelynn R. Lueth, Marina del Rey, CA (US); William Garnet, Marina del Rey, CA (US)

(72) Inventors: Jacquelynn R. Lueth, Marina del Rey, CA (US); William Garnet, Marina del Rey, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 18/368,810

(22) Filed: Sep. 15, 2023

Related U.S. Application Data

(63) Continuation-in-part of application No. 17/873,065, filed on Jul. 25, 2022, now Pat. No. 11,902,349, which is a continuation of application No. 16/931,236, filed on Jul. 16, 2020, now Pat. No. 11,399,053, which is a continuation-in-part of application No. 16/887,823, filed on May 29, 2020, now Pat. No. 11,102,265, which is a continuation-in-part of application No. 16/283,971, filed on Feb. 25, 2019, now Pat. No. 10,673,918, which is a continuation of application No. 15/281,803, filed on Sep. 30, 2016, now Pat. No. 10,218,762, which is a continuation of application No. 13/224,250, filed on Sep. 1, 2011, now Pat. No. 9,462,030, which is a continuation-in-part of application No. 13/198,679, filed on Aug. 4, 2011, now abandoned, which is a continuation-in-part of application No. 13/032,451, filed on Feb. 22, 2011, now abandoned, which is a continuation-in-part of (Continued)

(51) Int. Cl.
 H04L 65/75 (2022.01)
 H04L 65/611 (2022.01)
 H04L 67/131 (2022.01)

(52) U.S. Cl.
 CPC .......... H04L 65/765 (2022.05); H04L 65/611 (2022.05); H04L 65/764 (2022.05); H04L 67/131 (2022.05)

(58) Field of Classification Search
 CPC ... H04L 65/765; H04L 65/611; H04L 65/764; H04L 67/131
 See application file for complete search history.

(56) References Cited

U.S. PATENT DOCUMENTS

| | | | |
|---|---|---|---|
| 7,938,727 B1 * | 5/2011 | Konkle | ................... A63F 13/92 |
| | | | 715/764 |
| 8,019,815 B2 * | 9/2011 | Keener, Jr. | ......... H04N 21/4788 |
| | | | 709/204 |
| 2009/0186700 A1 * | 7/2009 | Konkle | ................... A63F 13/79 |
| | | | 463/42 |

* cited by examiner

*Primary Examiner* — El Hadji M Sall
(74) *Attorney, Agent, or Firm* — Kirby Drake

(57) ABSTRACT

The present disclosure generally provides a system and method for providing a real-time digital virtual audience. The system and method may include processing video associated with an event to produce a corresponding data stream, combining the corresponding data stream with at least one sequence of predictability data stream to create a digital framework, processing the digital framework into at least one representation of at least one object depicted in the video, and transmitting the at least one representation to one or more communication devices associated with one or more virtual audience members, wherein the one or more virtual audience members are viewing the same event using their respective communication devices.

19 Claims, 10 Drawing Sheets

Related U.S. Application Data application No. 12/897,606, filed on Oct. 4, 2010, now Pat. No. 8,918,532, which is a continuation-in-part of application No. 12/717,921, filed on Mar. 4, 2010, now abandoned.

(60) Provisional application No. 61/157,229, filed on Mar. 4, 2009.

SYSTEM AND METHOD FOR PROVIDING A REAL-TIME DIGITAL VIRTUAL AUDIENCE

CROSS REFERENCE TO RELATED APPLICATIONS

This application is a continuation-in-part of U.S. patent application Ser. No. 17/873,065, filed Jul. 25, 2022, which is a continuation of U.S. patent application Ser. No. 16/931, 236, filed Jul. 16, 2020, which is a continuation-in-part of U.S. patent application Ser. No. 16/887,823, filed May 29, 2020 which is a continuation-in-part of U.S. patent application Ser. No. 16/283,971, filed Feb. 25, 2019, which is a continuation of U.S. patent application Ser. No. 15/281,803, filed Sep. 30, 2016, which is a continuation of U.S. patent application Ser. No. 13/224,250, filed on Sep. 1, 2011, entitled "System and Method for Providing a Real-Time Three-Dimensional Digital Impact Virtual Audience," which is a continuation-in-part of U.S. patent application Ser. No. 13/198,679, filed on Aug. 4, 2011, entitled "System and Method for Providing a Real-Time Digital Impact Virtual Audience," which is a continuation-in-part of U.S. patent application Ser. No. 13/032,451, filed on Feb. 22, 2011, entitled "System and Method for Providing a Real-Time Digital Impact Virtual Audience," which is a continuation-in-part of U.S. patent application Ser. No. 12/897,606, filed on Oct. 4, 2010, entitled "System and Method for Controlling a Performance Environment" which is a continuation-in-part of U.S. patent application Ser. No. 12/717,921, filed on Mar. 4, 2010, entitled "Remote Audience Participation," which claims the benefit of Provisional Application No. 61/157,229, each of which are incorporated herein by reference in their entireties.

FIELD OF THE DISCLOSURE

The disclosure relates generally to entertainment services, live performances, virtual events/locations, and/or live events. In particular, the disclosure relates to systems and methods to provide a real-time digital virtual audience.

BACKGROUND

Television and, in particular, transmission of programming such as reality programming, live and/or taped events, such as performances or sporting events, continues to be very popular. However, interaction between viewers and participants as well among viewers while the programming occurs may not always satisfy the needs or wants of viewers.

SUMMARY

In an embodiment, the present disclosure could generally provide a method for providing a real-time digital virtual audience including processing video associated with a live event to produce a corresponding data stream, combining the corresponding data stream with at least one sequence of predictability data stream to create a digital framework, processing the digital framework into at least one full-form representation of at least one object depicted in the video, and transmitting the at least one full-form representation to one or more remote audience devices associated with one or more virtual audience members, wherein the one or more virtual audience members are viewing the same live event using their respective remote audience devices. The video may be filmed using a dual-processor compositing method. The digital framework may include one of the following:

color, movement and light density. The at least one sequence of predictability data stream may originate from a camera angle from a different vantage point at the live event. Processing the digital framework may be performed through an expansion rendering program. The video and the at least one sequence of predictability data stream may originate from at least one of the following sources: governmental satellite imagery, international satellite imagery, drones, ultra-high definition cameras, three-dimensional compositing cameras, dual-lens compositing cameras, and high-resolution data sources.

Another embodiment of the present disclosure may provide a real-time digital virtual audience system that may include one or more remote audience devices associated with one or more virtual audience members, wherein the one or more virtual audience members each receive at least one full-form representation of at least one object associated with a live event. Accordingly, the one or more virtual audience members may view the same live event and communicate among the one or more virtual audience members using their respective remote audience devices.

A further embodiment of the present disclosure may provide, for use in conjunction with a live event, a method for a virtual audience member to participate in a real-time digital virtual audience. The method may comprise obtaining a virtual ticket to the live event, selecting a link that accesses a coordinate associated with the live event, the coordinate providing the virtual audience member with a particular vantage point within the live event that may be manipulated by the virtual audience member, and communicating with at least one additional virtual audience member accessing the same coordinate associated with the live event. The virtual audience member may manipulate the particular vantage point by performing at least one of the following functions: turning right, turning left, and zooming in on one or more objects associated with the live event. The coordinate may be formed by processing video associated with the live event to produce a corresponding data stream, compositing the corresponding data stream with at least one sequence of predictability data stream to create a digital framework, and processing the digital framework into at least one full-form representation of at least one object depicted in the video.

Other embodiments of the present disclosure may provide for use in conjunction with an event, a method for a virtual audience member to participate in a real-time digital virtual audience comprising: obtaining a virtual ticket to the event, the virtual ticket associated with a designated seat or location at the event; selecting a link or a quick response (QR) code using a communication device to receive a locator code to access sound and a view associated with the designated seat or location at the event; receiving the sound and the view associated with the designated seat or location transmitted to a video cloud platform over a wireless communication network, the sound and the view including selectively providing the virtual audience member with a particular vantage point within the event that may be configured to be manipulated by the virtual audience member through the communication device; and wherein the sound and view may be formed by: processing video associated with the event to produce a corresponding data stream; combining said corresponding data stream with one or more individual data streams associated with the event, the virtual audience member, or other virtual audience members; and displaying audio and video associated with the corresponding data stream and the one or more individual data streams in real-time to the virtual audience member. The virtual audience member may manipulate the particular vantage point by performing at least one of the following functions: turning right, turning left, and zooming in on one or more objects associated with the event. The communication device may be selected from the group comprising: personal computer, a laptop computer, a Web-enabled mobile device, or any suitable communication device/system with access to the Internet or other communication network. The method may further include sending a picture of the virtual audience member via the communication device to the video cloud platform. The picture may be a still picture, an avatar, and/or a live video. The picture may be seen and/or heard at the event. The method also may include sending sound from the virtual audience member to the video cloud platform to be transmitted to the event. The method may further include communicating video and/or audio through the communication device with at least one additional virtual audience member through the communication network accessing at least one additional locator code associated with at least one other designated seat or location at the event, the at least one other designated seat or location located next to or around the designated seat. Communicating video and/or audio through the communication device with at least one additional virtual audience member may be through a picture-in-picture feature on the communication device. Communicating video and/or audio through the communication device with at least one additional virtual audience member may be by pivoting one or more of their respective vantage points to communicate with one another. Communicating video and/or audio through the communication device with at least one additional virtual audience member may be by tilting the communication device.

Further embodiments of the present disclosure may provide for use in conjunction with an event, a method for a virtual audience member to participate in a real-time digital virtual audience comprising: obtaining a virtual ticket to the event, the virtual ticket associated with a general location at the event; selecting a link or a quick response (QR) code using a communication device to receive a locator code to access sound and a view associated with a general location at the event; receiving the sound and the view associated with the general location transmitted to a video cloud platform over a wireless communication network, the sound and the view including selectively providing the virtual audience member with a particular vantage point within the event that may be capable of being manipulated by the virtual audience member through the communication device; and wherein the sound and view may be formed by: processing video associated with the event to produce a corresponding data stream; combining said corresponding data stream with one or more individual data streams associated with the event, the virtual audience member, or other virtual audience members; and displaying audio and video associated with the corresponding data stream and the one or more individual data streams in real-time to the virtual audience member. The communication device may be selected from the group comprising: personal computer, a laptop computer, a Web-enabled mobile device, or any suitable communication device/system with access to the Internet or other communication network. The method also may include sending a picture of the virtual audience member via the communication device to the video cloud platform. The picture may be a still picture, an avatar, and/or a live video. The picture may be seen and/or heard at the event. The method may further include sending sound from the virtual audience member to the video cloud platform to be transmitted to the event. Communicating through the communication device with at least one additional virtual audience member may be through a picture-in-picture feature on the communication device. The method may include communicating through the communication device with at least one additional virtual audience member through the communication network accessing at least one additional locator code associated with the general location at the event.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
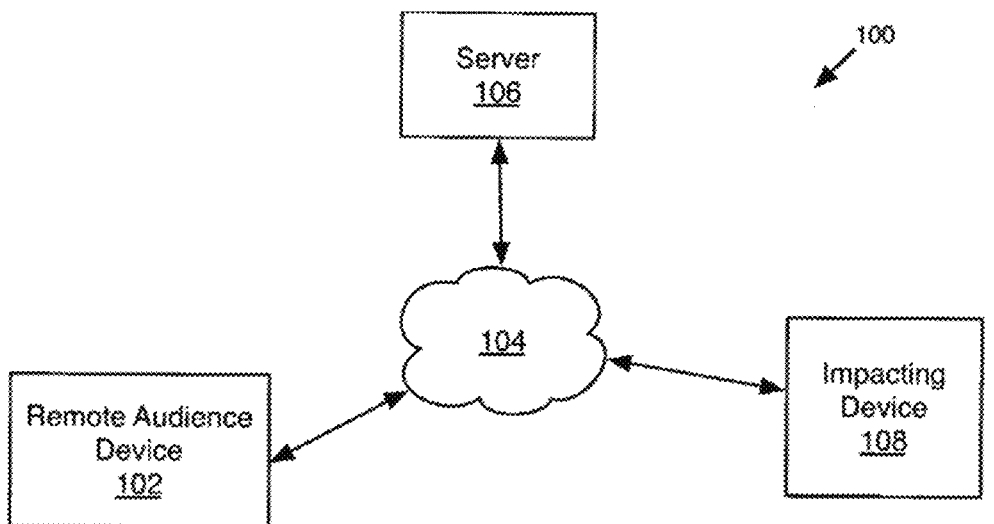
FIG. 1 is a block diagram of a system allowing communication from virtual audience members to provide a real-time digital virtual audience at a live event or performance according to an embodiment of the present disclosure.

Embodiments of the present disclosure generally provide a system of interactive technologies to involve virtual audience members in a live event or performance. Such involvement may permit the virtual audience member to distract, confuse, impact, instruct, command, or otherwise positively or negatively affect participants of, for example, television shows, sporting events, virtual events/locations, news broadcasts, theater performances, or webcasts in real-time. Other involvement may permit a virtual audience member to interact with one or more virtual audience members during the live event or performance. Virtual audience members may join an event and interact with friends who are also virtual audience members according to embodiments of the present disclosure. In other embodiments of the present disclosure, a visual (such as a vantage point) at the site of the live event or performance may be selected, and a community of virtual audience members may form around that visual. It should be appreciated that virtual audience members may interact with one another through video and/or audio in embodiments of the present disclosure.

As used herein, the term "event" is intended to convey the broadest possible meaning and refers to any happening, occurrence, appearance, ceremony, circumstance, experience, function, occasion, proceeding, situation, performance, debate, speech, election, etc. where virtual audience members may be involved with a live performance or event. By way of non-limiting example, in some embodiments, the event may be a live performance for a television show, theater show, or webcast; a live sporting event, concert event, reality show, news broadcast, or political event; a celebration, meeting, class, lecture, or any other live public or private event, or an event or activity occurring on the Internet or in a virtual location.

Embodiments of the present disclosure generally provide a system of interactive technologies that allow virtual audience members to communicate input to participants on site at the live event or performance. By way of non-limiting example, the virtual audience members may vote; judge; indicate an opinion; control a device used to distract, confuse, impact, instruct, and/or command participants at a live event; or otherwise positively or negatively involve himself/ herself with the live event or performance.

In certain embodiments, virtual audience members may transmit data through personal communication devices that communicate using different protocols. For example, virtual audience members may communicate through a computer, cellular phone, smartphone, or other video streaming technology. Using his/her personal communication device, a virtual audience member may transmit a visual display in the form of a streaming video, still picture, or avatar to be displayed at the site of a live event or performance. Audio associated with a visual display of the virtual audience member also may be retransmitted at the site of the live event or performance in its original form or as a representative and/or collective stream of audio. It should be appreciated that there may be embodiments of the present disclosure where a virtual audience member may access through one or more different protocols or devices and/or through an application or a website that may be included or accessible on one or more devices. For example, a virtual audience member may utilize his/her smartphone and access the live event or performance through the web browser that may be available on the smartphone and/or an application that may be provided to access the live event or performance. It also should be appreciated that there may be some embodiments of the present disclosure where the system may detect that the virtual audience member is merely utilizing his/her smartphone to access the live event or performance, whether through the web browser or an application, or by using text messaging on his/her smartphone to vote in connection with the live event. However, there may be other embodiments of the present disclosure where the system may detect that a virtual audience member is, for example, voting using text messaging, the web browser, and/or an application on the smartphone, such as for aggregation across protocol purposes.

In certain embodiments, virtual audience members may transmit a visual display and/or audio associated with the virtual audience member to express an opinion on, for example, whether to increase, eliminate or decrease obstacles to advantage/disadvantage a performer. For example, a virtual audience member may provide an opinion that causes a light or other similar objects to light up, blink, or strobe with varying duration, frequency or intensity; causes a sound or multiple sounds of varying volumes and pitch; causes water, ice, sand, foam, paint, smoke or any other physical impediment to increase or decrease; causes the difficulty of questions posed to a performer to increase or decrease; causes the spiciness of food in an eating contest to increase or decrease, etc.

To illustrate the teachings of the present disclosure, FIG. 1 depicts a somewhat simplified schematic of a representative system 100 to permit communication from at least one virtual audience member and provide a real-time digital virtual audience at a live event or performance according to an embodiment of the present disclosure. Such virtual audience communications may be transmitted substantially in real-time and displayed at the live event or performance. It should be understood that system 100 shown in FIG. 1 is for illustrative purposes only and that any other suitable system or subsystem could be used in conjunction with or in lieu of system 100 according to one embodiment of the present disclosure.

System 100 could include remote audience device 102, communication network 104, and server 106 according to one embodiment of the present disclosure. Although one remote audience device 102, communication 104, and server 106 are illustrated in FIG. 1, it should be appreciated that system 100 could include any number of suitable devices, networks, or servers without departing from the object of the present disclosure.

Remote audience device 102 (also referred to as a personal communication device in some embodiments of the present disclosure) could include a user terminal, standalone unit, network device, machine, wireless device, telephone system, Smartphone, Internet portal, Intranet portal, remote access portal, hand-held unit, other suitable device or terminal, or any combination thereof. Remote audience device 102 could provide the virtual audience member with multiple options on how to communicate with a performer at the site of the live event through, for example, a menu-driven system, graphical user interface, buttons, switches, dials, other actuation systems, video and/or audio streaming/ capture systems, or any combination thereof. In one embodiment of the present disclosure, a virtual audience member may communicate with a participant at a live event by logging onto a social media website, such as Facebook, and connecting through a portal or other communication mechanism associated with the live event in order to provide messages in video, image, textual, and/or audio format. While participants may include a host or other person present at the event, it should be appreciated that the word "participant" may also include audience members depending on the circumstances in embodiments of the present disclosure. Further, while a portal is described herein, other communication mechanisms may be utilized for virtual audience members to communicate without departing from the present disclosure.

Remote audience device 102 could receive an input from a virtual audience member to provide feedback or otherwise communicate or distract someone associated with a television show, webcast, video blog, theater show, sporting event, physically challenging event, team event, business event, performance, sales or marketing venture, virtual event/ location, or other form of entertainment. The input signal could be transmitted through communication network 104 and processed by server 106 to provide a corresponding output and permit the virtual audience member to communicate directly to participants on site at the live performance or event.

In another embodiment of the present disclosure, a virtual audience member may communicate with other virtual audience members to form a community that may be viewing the same live event or performance. The virtual audience members comprising such a community may know each other. For example, virtual audience members may join a live event and interact with friends who are also virtual audience members according to embodiments of the present disclosure. Additionally or alternatively, virtual audience members may be united to interact based in whole or in part on mutual interest in the live event or event performance. In other embodiments of the present disclosure, a visual (such as a vantage point) at the site of the live event or performance may be selected, and a community of virtual audience members may form around that visual. In each of these embodiments, a virtual audience member may communicate with other virtual audience members using remote audience device 102. In such embodiments, remote audience device 102 could receive an input from a virtual audience member to initiate or continue communication with one or more virtual audience members. This interaction may be through video and/or audio according to embodiments of the present disclosure.

The virtual audience member using remote audience device 102 could be physically located at any suitable location, including his/her home or business. It also should be appreciated that a virtual audience member may be located in any part of the world, such that, for example, television shows being filmed in the United States can involve a worldwide audience. In another embodiment of the present disclosure, remote audience device 102 may be a portable personal communication device, such as a cellular phone or Smartphone, and accordingly, the virtual audience member may utilize remote audience device 102 in any location where communication network 104 may be accessed. As an example, the virtual audience member could use remote audience device 102 as the live performance occurs (e.g., real-time) to provide a message, vote, communication, command, encouragement, coaching advice, or distraction to the performer as desired in order to, for example, show support or provide criticism of a particular performance or viewpoint of the performer. In other embodiments of the present disclosure, the virtual audience member may use remote audience device 102 during a live event to communicate with other virtual audience members. Such communication may be to comment on various items, including but not limited to, what is happening with the live event (such as a call by a referee or a score that occurs during a sporting event) or the participants in the live event (such as a team, a performer, an athlete, a referee, or an announcer associated with the live event).

Communication network 104 could be any suitable network including, for example, a dedicated network connection, wire-line connection, wireless connection, Internet, Intranet, Wi-Fi, LAN, WAN, mobile phone communication network, telecommunications network, a cloud-based network, other suitable communication systems, or any combination thereof. Communication network 104 could be coupled to or include any suitable number or types of connections between remote audience device 102 and server 106. For example, a signal received from remote audience device 102 could be processed through the Internet to server

106. In another embodiment, a signal received from remote audience device 102 could be processed through a mobile phone communications network to server 106 and further processed through a Wi-Fi network located at the site of the live event or associated with a virtual event/location, for example.

Server 106 could be configured to receive and process data, signals, query requests, audio, images, and/or video, and output any such information as necessary from any number of sources, including, for example, remote audience device 102 or communication network 104. Server 106 could generally include any server, group of servers, databases, memories, applications, software, computer programs, routines, other objects, or any combinations thereof. Server 106 could communicate with one or more communication networks such as, for example, a dedicated network connection, wire-line connection, wireless connection, Internet, Intranet, Wi-Fi, LAN, WAN, mobile phone communication network, social communication network, other suitable communication systems, or any combination thereof. In embodiments of the present disclosure, a server or group of servers may be used for video and/or audio communications between virtual audience members and participants at the live event or performance while another server or group of servers may be used for communications between or among virtual audience members. In other embodiments of the present disclosure, the same server or group of servers may be used both for communications between virtual audience members and participants at the live event or performance as well communications between or among virtual audience members.

System 100 also may include an aggregator that may be at the site of a live performance or associated with an event, whether at a physical location or virtual in nature. In certain embodiments, an aggregator may be configured to receive data and/or audio transmissions originating from a plurality of remote audience devices 102. Using an aggregator or series of aggregators, data bursts may be counted from numerous locations very quickly, and these tallies may be added together to create a single constantly growing number that may then be used, for example, to incrementally change something and/or to show public opinion (as in a voting method). The number of data sources being processed, as well as the volume of data, may drive how many aggregators may be needed to result in one consolidated, rapidly growing number. Systems according to embodiments of the present disclosure may read a portion of code associated with a data burst and ignore the rest, allowing the remainder to pass through unprocessed. Accordingly, as each data burst passes through systems according to embodiments of the present disclosure, the data burst may not be collected or fully processed, only counted and permitted to pass through, thereby forming a running tally associated with that data burst. The running tally may grow incrementally and in turn may be processed as a set or as continuous numbers that may be sent in bursts or as a continuous stream into rapid calculation algorithms within an aggregator. An aggregator may take these bursts or continuous stream (such as a combination of all tallies) and output the bursts and/or stream to any variety of mechanical, informational, or other end sources. At the end source, these bursts and/or stream may be used to create or elicit any number of reactions, including but not limited to, causing volumetric release or absorption of a liquid to incremental increases or decreases in the difficulty of a challenge to revealing who won an opinion debate or election.

It should be appreciated that regardless what the tally represents or what form the tally takes (i.e., numbers, words, or even emojis), the tally may result in a behavioral change by one or more participants in response to the tally. In an embodiment of the present disclosure, a teacher may be teaching an online class and may periodically quiz or poll the students to get a feel for whether the students are absorbing the information being taught. The students may respond using a variety of formats, and the responses may be aggregated through a tally to summarize the results for the teacher. Depending on the number of students that answer the questions correctly, the teacher may be prompted to go back over the information previously taught or move forward to a new subject. In addition, a system according to embodiments of the present disclosure may be used for a student government meeting to provide feedback on topics to be covered, for example, or how the student government should react and move forward.

A system and method according to embodiments of the present disclosure may be used in connection with video games. For example, live streaming platforms, such as Twitch, allow viewers to watch video game players and interact with them. The player may periodically seek feedback from the viewers as to what action(s) he/she should take in playing the video game. The viewers may vote or respond through a variety of means of communication, and the responses may be tallied to direct the player as his/her next action(s).

The received data and/or audio transmissions may include a visual display of the virtual audience member, in the form of a streaming video, still picture or avatar, and/or an audio transmission. Such data and/or audio transmissions may be transmitted, for example, through a Smartphone application, a personal computer, or other audio and/or video streaming technology. An aggregator also may receive certain data transmissions originating from each remote audience device 102. It should be understood that system 100 could include any number of remote audience devices, aggregators, servers, processors, or other electromechanical devices.

Virtual audience members associated with the live event or performance may operate remote audience devices 102. The data and/or audio transmission originating at any of remote audience devices 102 may be transmitted through any suitable communication network, such as a PSTN, the Internet, and/or an Intranet as described above.

A virtual audience member may operate remote audience device 102 while watching the live performance or event wherever in the world that the virtual audience member is located. For example, the virtual audience member may use remote audience device 102 to send a message, vote, communication, command, encouragement, coaching advice, or distraction to the performer as desired in order to, for example, show support or provide criticism of a particular performance or viewpoint of the performer. In some embodiments, the data and/or audio transmission from the virtual audience member may, for example, provide instruction or otherwise influence a team sport, a team play or strategy, an individual play or strategy, increase/decrease physical intensity, increase/decrease psychological challenges, increase/decrease mental challenges, or any suitable combination thereof. A virtual audience member may also vote to provide clues to participants in the event, or in a performance-type event, a virtual audience member may be prompted to vote to select a participant to perform again. In another embodiment, during a news broadcast, a virtual audience member may provide comments on or react to events as they continue to unfold. Such comments or reactions may be communicated to participants on site associated with the live event or performance. Additionally or alternatively, such comments or reactions may be communicated between or among virtual audience members, such as through a chat format.

In one embodiment, the event may be a performance occurring live. The performance may be being broadcast on television or otherwise transmitted to an audience, such as through a virtual environment or location. The performance may include participants "A" and "B". As part of the transmission or over-the-top (OTT) media service, the audience may be invited to "vote" for or against or express an opinion related to participant "A" or "B". A vote for participant "A" may correspond to an environment, situation, or circumstance associated with participant "A" being incrementally influenced or otherwise controlled by the number of "votes" received for or against participant "A". Similarly, a vote for participant "B" may correspond to an environment, situation, or circumstance associated with participant "B" being incrementally influenced or otherwise controlled by the number of "votes" received for or against participant "B".

While viewing the transmission or over-the-top (OTT) of the event, a virtual audience member may use remote audience device 102 to communicate a vote or express an opinion on what is occurring at the event. One or more servers 106 may receive the votes or opinions from virtual audience members. In certain embodiments, server 106 may be a bank of multiple servers.

A vote or opinion may be communicated from remote audience device 102 to server 106 and, in some embodiments, on to an aggregator using any suitable communication network 104. Moreover, in certain embodiments, a vote or opinion may be communicated directly to participants at the site of the live event.

A protocol, such as communication through the World Wide Web, may be used according to an embodiment of the present disclosure. A virtual audience member with access to the Internet may observe the live event through remote audience device 102. Additionally, or alternatively, a virtual audience member may have remote audience device 102 available for use to interact with the live event itself or with other virtual audience members while viewing the live event on his/her television, for example. Remote audience device 102 may be a personal computer, a laptop computer, a Web-enabled mobile device, or any suitable communication device/system with access to the Internet or other communication network. As part of the live transmission or over-the-top (OTT), the virtual audience may be invited to communicate a vote or opinion for or against participant "A" or "B". A vote for or against participant "A" may correspond to an environment, situation, or circumstance associated with participant "A" being incrementally influenced or otherwise controlled by the number of "votes" received for or against participant "A". Similarly, a vote for or against participant "B" may correspond to an environment, situation, or circumstance associated with participant "B" being incrementally influenced or otherwise controlled by the number of "votes" received for or against participant "B". While virtual audience members may communicate a vote or opinion to the live event as described above, virtual audience members also may communicate with each other about those votes or opinions.

The user may use remote audience device 102 to communicate a web vote or opinion using access to a web address or uniform resource locator (URL). A web data stream may represent each web vote or opinion communicated using remote audience device 102 for or against participant "A". Similarly, each web vote or opinion communicated from remote audience device 102 for or against participant "B" may be represented by a Web data stream. In certain embodiments, each website request or web vote may be received by server 106 and communicated directly via audio and/or data transmission to a participant in the live event such as via a screen or monitor available at the live event. When a vote or opinion is received at the site of the live event, a participant may view or hear the vote or opinion by accessing the screen or monitor connected to communication network 104. As an example, when server 106 receives a web vote or opinion over communication network 104, an image (i.e., a still shot or avatar) of the virtual audience member may appear on the screen or monitor. If audio and/or video is associated with the image, a participant on site at the live event may activate such audio and/or video in a variety of manners. For example, if the screen or monitor has touch-screen capabilities, the participant may touch the image of the virtual audience member in order to activate the audio and/or video associated with the image and otherwise interact with the virtual audience member. In other embodiments, a participant may use a mouse or other tracking device in order to select the image and activate the audio and/or video or otherwise interact with the virtual audience member. In another embodiment of the present disclosure, a virtual audience member may be a fully functioning participant in the live event from the outset of the live event. For example, when the live event begins, the virtual audience member may already be present on the screen or other display and interacting with the participants, without requiring activation of the display during the live event. In an alternative embodiment of the present disclosure, a virtual audience member may be introduced into an virtual event or a virtual location under the control of a participant or host in a similar manner as described above, or the virtual audience member may be an active participant from the outset of the virtual event, for example, by logging into the virtual event/location.

It also should be appreciated that the screen or monitor at the site of the live event and/or associated with a virtual event/location may display images as well as transmit audio and/or video of more than one virtual audience member at the same time, for example, in a checkerboard pattern on the screen or monitor. Additionally, or alternatively, the screen or monitor may display a listing of any virtual audience members who are available at any given time to interact with the participants on site at the live event. A website request to participate may be communicated from remote audience device 102 to server 106 using any suitable communication network 104, such as the Internet or Intranet. In a further embodiment, the data associated with the web vote or opinion may be transformed into a running tally that is communicated to an aggregator.

According to an embodiment of the present disclosure, when virtual audience members communicate with one another, a still picture, streaming video, or an avatar associated with a virtual audience member may appear on the screen or other display of other virtual audience members. Such a display may occur without requiring activation of the display during the live event or may appear upon activity occurring associated with that virtual audience member. For example, virtual audience members may be associated with a particular viewing location within a stadium during a professional football game. In certain embodiments, virtual audience members within this section may know each other and have elected to virtually join the live event collectively; however, in other embodiments, virtual audience members within a section may not know each other or may only know some of the other virtual audience members. In either instance, virtual audience members within a given section may interact with each other during the live event. When such interaction occurs (i.e., when a virtual audience member initiates a chat with one or more virtual audience members), still pictures, streaming video, or avatars associated with each virtual audience member may appear on the displays of their respective remote audience devices. In an alternative embodiment of the present disclosure, a virtual audience member may be introduced into a virtual event or a virtual location under the control of another virtual audience member, or the virtual audience members may be active participants from the outset of the virtual event, for example, by logging into the virtual event/location.

It also should be appreciated that in certain embodiments of the present disclosure, the screen or monitor associated with each virtual audience member's remote audience device may be configured to display images as well as transmit audio and/or video of more than one virtual audience member at the same time, for example, in a checkerboard pattern on the screen or monitor. This audio/video may be retransmitted in its original form or as a representative and/or collective stream of audio/video. Additionally, or alternatively, the screen or monitor may display a listing of any virtual audience members who are available at any given time to interact with other virtual audience members who are participating in the live event.

A live event or performance may transmit a video and/or audio stream (i.e., the transmission or OTT) that may be picked up by a remote audience device associated with a virtual audience member. Accordingly, the transmission or OTT may be streamed onto the virtual audience member's remote audience device. While the transmission or OTT is streamed, a camera/microphone recording unit associated with a remote audience device may capture video and/or audio associated with a virtual audience member as he/she responds to the transmission or OTT being streamed. One or more signals associated with a virtual audience member's reactions may be transmitted back to the site of the live event or performance. The one or more signals may be collected by a series of organizational computer banks and then transmitted at the site of the live event or performance in any size definable on the screen therein.

Embodiments of the present disclosure may provide that a prospective virtual audience member purchases or otherwise obtains a virtual ticket to a live event or performance. This virtual ticket may provide for "general admission" where the live event or performance would be viewable through the virtual audience member's remote audience device. With such a general admission virtual ticket, the virtual audience member would view the live event or performance from the camera angle(s) specified or selected for remotely viewing the event or performance, and the virtual audience member also may hear (have audio) that may be generally provided for the event or performance.

In another embodiment of the present disclosure, a virtual audience member may purchase or otherwise obtain a virtual ticket to view the live event or performance, for example, from a specific camera angle and/or from a camera positioned within a certain area on site at the live event or performance. For example, a virtual audience member may purchase or obtain a virtual ticket so that he/she may view and hear the event as if he/she were sitting on the 50-yard line at a football game or at center court at a basketball game. However, another virtual audience member may elect to purchase or obtain a virtual ticket that may provide a view from a position with the stadium that is more remote from the court or field and may cost less than the 50-yard line or center court view. It should be appreciated that there may be embodiments of the present disclosure where the virtual audience member may select a particular "seat" which may provide audio and/or video associated with the event; however, there may be other embodiments of the present disclosure where the virtual audience member may select a section or area of the venue where the event is occurring without selecting a specific seat.

It should be appreciated that virtual audience members may coordinate to purchase or obtain virtual tickets within the same "section" at a live event or performance. For example, groups of friends who may live in different geographical areas but would enjoy watching a sporting event together if they were located in the same geographical area or were on site at the live event or performance may elect to purchase or otherwise obtain virtual tickets together. In such an embodiment, these virtual audience members may elect to obtain virtual tickets having a 50-yard line visual, and there may be audio associated with that specific visual in an embodiment of the present disclosure. Accordingly, they would each be viewing (as well as hearing) the football game in real-time from the same vantage point using their remote audience devices. As these virtual audience members have virtual tickets for the same section, embodiments of the present disclosure may permit them to chat or otherwise interact with each other during the event using their respective remote audience devices. In such embodiments, these virtual audience members may interact with each other in a similar manner as they might interact if they were sitting together in the same physical section on site at the live event.

Virtual aggregators may take a large number of audio and/or video streams and create a composite stream-essentially a capture of all of the streams. The composite stream may then be retransmitted/streamed to each of the virtual audience members. Accordingly, each virtual audience member in a "virtual ticket" section may see and/or hear their friends, the audio/video of the live event or performance, and/or themselves during the live event or performance for which the virtual audience member has a "virtual ticket." There also may be embodiments of the present disclosure where virtual audience members may hear ambient noise that may be associated with the event, such as foot stomping, yelling, or clapping at a sporting event. In some embodiments of the present disclosure, there may be more than one audio stream from the virtual audience members that may be transmitted back to the event. These audio streams may be mixed with ambient noise and/or audio from other virtual audience members.

Virtual aggregators may compile video transmissions into a series of simple, organized streams that may function within the pre-created format of a virtual audience in-venue computer system according to embodiments of the present disclosure. In embodiments of the present disclosure, video and/or audio associated with a virtual audience member may be transmitted to a server or other computer system associated with a live event or performance. This video and/or audio also may be transmitted to one or virtual aggregators. Similarly, a transmission stream from the live event or performance may be transmitted to one or more virtual aggregators. Within the one or more aggregators, each video and/or audio stream may be aggregated to combine the transmission stream with the individual streams associated with virtual audience members, and the combined stream may be sent to a virtual audience member as a single stream or transmission/OTT with all elements visible to the virtual audience member.

Accordingly, instead of each virtual audience member's remote audience device needing to process not just the transmission/OTT/stream from the live event or performance, the virtual audience member's remote audience device also may transmit from each virtual audience member, for example, associated with a "virtual ticket" section. Therefore, a virtual audience member's remote audience device may only process one stream while still hearing and seeing everyone and everything associated with the live event or performance as well as those members of his/her "virtual ticket" section.

While this interaction between virtual audience members has been described particularly with respect to virtual audience members who obtain virtual tickets for same "section" for viewing the live event or performance, it should be appreciated that interaction between or among virtual audience members may occur in other manners. For example, virtual audience members who obtain what may be referred to as a "general admission" virtual ticket may be provided with a mechanism to chat or interact with other interested virtual audience members during the live event or performance. In this embodiment, virtual audience members may be provided with a specified code to use upon logging into the virtual event to be associated with virtual audience members interested in interacting with other virtual audience members during the event. In another embodiment, virtual audience members may be asked to establish a login or code upon obtaining the virtual ticket that may be provided to certain virtual audience members upon request to establish communication links. Having such a login or code to share with other virtual audience members may permit interaction among virtual audience members who have obtained "general admission" virtual tickets, between virtual audience members who may have purchased special "section" virtual tickets but not in the same "section," and/or between a virtual audience member having a "general admission" virtual ticket and another a virtual audience member having a special "section" virtual ticket.

In embodiments of the present disclosure, a website or portal that a virtual audience member may access to participate in the live event or performance may allow virtual audience members to establish sessions, such as may be provided through video conferencing or live streaming platforms, to chat with virtual audience members who may be friends and want to interact during the live event or performance. In other embodiments, sessions may be to communicate with other virtual audience members having a similar interest with respect to the live event or performance. For example, if the live event or performance was a football game, a chat session may be established so that virtual audience members cheering for one team or having an interest in a certain player may interact with each other. In an additional or alternative embodiment of the present disclosure, a chat session may be established for a specified "section" at the live event or performance, and virtual audience members who have obtained a virtual ticket for that "section" may be provided with a code or login information at the time that he/she obtains the virtual ticket that will permit the virtual audience member to enter the chat associated with his/her "section."

As previously discussed, it should be appreciated that there may be embodiments of the present disclosure where a virtual audience member may access a live event or performance through one or more different personal communication devices and/or through an application or a website that may be included or accessible on one or more devices. For example, a virtual audience member may utilize his/her smartphone and access the live event or performance through the web browser that may be available on the smartphone and/or an application that may be provided to access the live event or performance. It also should be appreciated that there may be some embodiments of the present disclosure where the system may detect that the virtual audience member is merely utilizing his/her smartphone to access the live event or performance, whether through the web browser or an application, or by using text messaging on his/her smartphone to vote in connection with the live event. However, there may be other embodiments of the present disclosure where the system may detect that a virtual audience member is, for example, viewing the live event or performance or engaging in interaction with other virtual audience members using the web browser and/or an application on the smartphone. There may be further embodiments of the present disclosure where the system may be access-type agnostic, meaning that it need not determine specifically how the virtual audience member is accessing the live event or performance as long as he/she is authorized to do so.

Another embodiment of the present disclosure expands upon the "virtual ticket" by permitting a virtual audience member to have a view of a live event or performance as if the virtual audience member were physically present at the live event or performance. In addition to video, the virtual audience member also may be provided with audio that he/she would hear if present at the event. In an embodiment of the present disclosure, the vantage point or visual that the virtual audience member sees when he/she views the live event or performance may change, and this change may be made by the provider of the live event or performance and/or by the virtual audience member in embodiments of the present disclosure. As previously discussed, a virtual audience member may view video and/or audio associated with a live event or performance on his/her remote audience device, such as his/her computer, phone or other mobile device. However, with a "virtual ticket" view according to embodiments of the present disclosure, one or more signals transmitted to a virtual audience member may be created using ultra-high-resolution video of a live event or performance. This is because the transmission stream in this embodiment of a "virtual ticket" may be a representation of the live event or performance as the event/performance is occurring that may replicate what the experience of being at the live event or performance. For example, the virtual audience member using a "virtual ticket" may have the same type of experience from a visual and audio/sound perspective as if the virtual audience member were physically present at the live event or performance. In addition, the "virtual ticket" experience may allow the virtual audience member to talk to other virtual audience members in an embodiment of the present disclosure. The transmission/OTT stream may be created through a series of advanced quality cameras or other recording devices that may output high-resolution photos and/or video to one or more computing devices. It should be appreciated that there may be embodiments of the present disclosure where a content delivery network (CDN) may be used to provide for delivery of content to virtual audience members. The CDN does not typically host content but may provide for improved delivery to the virtual audience members through utilization of caching, for example, which may reduce hosting bandwidth and help prevent interruptions in the audio and/or video being provided to virtual audience members.

This stream may be put through a series of rendering processes in some embodiments of the present disclosure. Such computing devices may each be set to process a unique photo and/or video. Each unique photo and/or video feed may be analyzed by a specific computing device and/or bank of computing devices that may read the density of the shadows associated with each person and/or object being filmed. Each computing device and/or bank of computing devices may apply these shadow-density readings to a variable algorithm that may transform the processed shadow-density readings into a framework of data points associated with each person and/or object being filmed. This is a process that may be known to those of ordinary skill in the art in creating special effects creatures using the movement of real actors applied in the "virtual ticket" context. Each framework of data points may then be processed through another computing device and/or network of computing devices that may read and process the data points through structuring platforms, thereby forming digital versions of each person and/or object processed, as well as a landscape out of the world surrounding those objects.

In this embodiment of the present disclosure, a virtual audience member purchasing a "virtual ticket" may be given a link (i.e., on a website or through a mobile application) to select that will take him/her to an exact coordinate associated with the live event or performance that may be created through these processing techniques. This coordinate may be considered the remote audience member's "seat" at the live event or performance. This coordinate may provide a virtual audience member with a specified angle or vantage point within the live event or performance whereby the virtual audience member may, for example, turn to the left or right and even zoom in on the action occurring at the live event or performance. It should be appreciated that the system that may be providing the virtual audience member with the ability to modify his/her angle or vantage point may allow for duplication of the video associated with the virtual audience members viewing from a particular section. Accordingly, each virtual audience member may selectively modify his/her angle or vantage point without disturbing the angle or vantage point of another virtual audience member that may be viewing from the same section in embodiments of the present disclosure.

For example, a virtual audience member may purchase a "virtual ticket" to a professional football game. The virtual audience member may select a particular coordinate associated with a 50-yard line view within the stadium where the professional football game is occurring. Accordingly, the virtual audience member may turn to the left or right to have a better view of the action that may be happening in either end zone. Further, a virtual audience member may zoom in to have a better view of the quarterback during a particular play in the game or even to view what may be occurring when a play has been challenged. However, it should be appreciated that the virtual audience member may not alter the angle or vantage point once a coordinate has been selected because the central pivot point has been locked. If the virtual audience member opts to change his/her angle or vantage point, a different coordinate may be selected, such as by obtaining a different "virtual ticket." However, there may be embodiments of the present disclosure where the virtual audience member may have the ability to change the angle or vantage point.

By providing a virtual audience member with a view of a live event or performance, the virtual audience member may see all of the action that may be associated with his/her virtual position within a venue associated with a live event or performance. If a virtual audience member is viewing a live event or performance from a certain vantage point (i.e., the 50-yard line at a football game or the front row of a concert), the virtual audience member may remotely view all of the action occurring around that vantage point as if he/she were sitting in that physical vantage point (i.e., seat) at the live event or performance. According to embodiments of the present disclosure, a virtual audience member viewing a live event or performance through a remote audience device may experience a view of the live event or performance as if he/she were physically present at the live event or performance without the need for special glasses. Accordingly, a virtual audience member may be provided with a fully multi-dimensional world that may be visible and updated in real-time to his/her remote audience device.

In some embodiments of the present disclosure, images or video that may be viewed by a virtual audience member according to embodiments of the present disclosure may be more than two-dimensional or flat images. Regardless, each image may be a map of densities, color variations, and movement once such images are placed into digitized form. Each aspect of an image may be broken down into algorithms depicting how the image may change when the next image is captured if the action contained within the first image were permitted to continue. When processing video, such as video that may be captured through a dual-processor compositing method (i.e., a method used by directors such as James Cameron to capture/create movies in 3D), each frame within the video may provide as much or even more information than what may be provided by a standard photograph. Accordingly, when each frame of a video may be processed in this manner, the corresponding data may be extensive and extremely accurate in its ability to map out and predict how the first frame of video may be changed in the next frame.

By having this level of comprehensive data combined with generated sequence-of-predictability models, data streams may be output and then composited with matching data and predictability models from similar sources (i.e., camera angles from multiple other vantage points associated with a live event or performance). Accordingly, highly accurate digital frameworks of how different aspects, including but not limited to, color, movement, and/or light density, may change from frame to frame may be created. Data composites may then be processed through Maya or CAD-like expansion-rendering programs in some embodiments of the present disclosure. Such programs may take these digital frameworks and fill them out into detailed, full-body and/or full-form representations of the actual people and/or objects being depicted. It should be appreciated that some objects associated with a live event or performance may be stationary (i.e., the field, court and/or seats at a sporting event). It follows that the representations of people and/or objects that are mobile during the live event or performance may be easier and faster to process, thereby allowing the compilers to add increasing detail to a person and/or object being filmed. These representations may then be streamed or transmitted out into a standardized digital space that may divided based on vantage points, for example, associated with a virtual audience member or groups of virtual audience members that have certain "virtual tickets" as previously described. It should be appreciated that the number of "virtual tickets" available related to a particular vantage point may be limited to expedite how fast a virtual audience member may be able view audio and/or video on his/her remote audience device as well as to limit the processing load that may be needed to provide a real-time virtual view of a live event or performance. It should be appreciated that images provided to a virtual audience member according to this embodiment of the present disclosure may be provided from one or more sources, including but not limited to, governmental or international satellite imagery, drones, ultra-high definition cameras, three-dimensional or dual-lens compositing cameras, or any other high-resolution source.

A virtual audience member also may request a particular website, uniform resource locator (URL), or IP address associated with a particular participant, such as participant "A". If the virtual audience member requests such a particular website, for example, this request may place the virtual audience member in a queue or otherwise make the virtual audience member available to interact with participant "A" during the live event. This data and/or audio transmission may be from remote audience device 102 through server 106. Server 106 may be associated with one or more websites, URLs, or IP addresses. The user may be presented with a website displayed using remote audience device 102. The website also may include one or more virtual voting buttons such that if the virtual audience member does not always elect to interact directly with participants in the live event through audio and/or video, he/she may choose to just cast a vote. When a virtual audience member uses an input device such as a mouse, touch screen, space bar or the like to "click" on a voting button associated with a particular participant, the website request initiated by the click may be received by server 106. The virtual audience member also may use his/her input device to enter the queue to interact with one or more participants on site at the live event.

Should the virtual audience member submit a website request in the form of a vote, such vote may be processed by an aggregator or server 106 as a discrete "vote" to be included in a tally associated with participant "A". In this manner, the data transfer or burst from remote audience device 102 may be tallied as an increasing data stream substantially in real-time. Each click of the voting button may be processed as a discrete website request or web vote regardless of remote audience device 102.

In one embodiment, each virtual audience member may submit as many website requests or web votes from the same IP address as the user desires. In an alternate embodiment, system 100 may store the IP address of remote audience device 102 and/or some other form of personal identification information. Then, if an additional website request or web vote is received from that same IP address and/or matching the stored personal identification information, a webpage indicating that a vote has already been received may be displayed on remote audience device 102. In this manner, a virtual audience member may be prevented from casting multiple votes from the same remote audience device. Similarly, if the virtual audience member has already interacted with one or more participants at the live event during the course of the transmission/OTT, the virtual audience member may be prevented from reentering the queue. This increasing tally may be similar to a conventional website counter or hit counter that is known in the art.

An additional communication protocol may be used according to an embodiment of the present disclosure. For example, remote audience device 102 may be a Smartphone operating a Smartphone application that has been installed on remote audience device 102. The application may permit the virtual audience member to enter a queue in order to express an opinion or vote during the live event. Should remote audience device 102 have audio and/or video capabilities, the virtual audience member may use remote audience device 102 in this manner.

As part of the event, the audience may be invited to submit a Smartphone "vote" for or against participant "A" or "B". A vote for or against participant "A" may correspond to an environment, situation, or circumstance associated with participant "A" being incrementally influenced or otherwise controlled by the number of "votes" received for or against participant "A". Similarly, a vote for or against participant "B" may correspond to an environment, situation, or circumstance associated with participant "B" being incrementally influenced or otherwise controlled by the number of "votes" received for or against participant "B".

The user may use remote audience device 102 to communicate a Smartphone vote or opinion. The vote or opinion may be communicated using a communication protocol similar to those previously described. In other embodiments, the vote from remote audience device 102 may be communicated using access to a web address as described above. Each vote communicated from remote audience device 102 for or against participant "A" may be received by the server 106 and transformed into a running, increasing number or tally represented by Smartphone data stream 126a. Similarly, each vote communicated from remote audience device 102 for or against participant "B" may be received by server 106 and transformed into a running, increasing number or tally represented by Smartphone data stream 126b.

In a further embodiment of the present disclosure, a virtual audience member may express his/her vote or opinion through an audio stream retransmitted at the site of the live event or in connection with a virtual event/location, for example. This audio may be retransmitted in its original form or as a representative and/or collective stream of audio. When such audio is transmitted at the live event, the audience viewing the live event may also be able to see a visual display of the virtual audience member. Such visual display may take the form of a streaming video, still picture or an avatar.

Similar to the web and text protocols, a numeric string, code, or website address may be associated with a particular participant, such as participant "A". The data transmission from remote audience device 102 may be processed by an aggregator or server 106 as a text message or a website request and computed by an aggregator or server 106 as a discrete "vote" to be included in a tally. In this manner, the data transfer or burst from remote audience device 102 may be tallied as an increasing data stream in nearly real-time. In a further embodiment of the present disclosure, the virtual audience member may be asked to input a numeric string, code, or website address associated with a particular participant using his/her remote audience device 102 in order to enter a queue to interact with a particular participant. Should a virtual audience member not opt to interact with a particular participant, in another embodiment of the present disclosure, the virtual audience member may be asked to input a numeric string, code or website address in order to enter a general queue associated with the live event so as to generally interact with participants at the live event.

An additional communication protocol may be accommodated by system 100. For example, one additional communication protocol may be the standard telephone service that has traditionally been used to transfer voice communications. In this embodiment, a standard telephone number may be associated with a particular participant. A user may use remote audience device 102 to communicate by a traditional telephone call to a traditional telephone number, thereby communicating only through an audio transmission to the live event. It also should be appreciated that a virtual audience member in another country or region of the world may dial into or connect with the event or location through a call or text message, for example, using a global access route. Such a global access route may be local per country or may be local per region. Server 106 may receive these calls. Server 106 may be operable to digitally process each received call as a vote and transform these calls into a running data stream or tally. Similarly, server 106 may be operable to digitally process each received call from remote audience device 102 as a vote and transform these calls into a running data stream or tally for or against participant "B." In a further embodiment of the present disclosure, server 106 may log the call into a queue to permit the virtual audience member to interact through audio transmission with participants at the live event.

The present disclosure contemplates that any number of additional communications protocols may be accommodated by system 100 beyond those specifically described above, including technologies not listed above, later-developed communication technologies, etc.

In certain embodiments, an aggregator may receive information from data and/or call streams. An aggregator may generally include any server, group of servers, databases, memories, applications, software, computer programs, routines, other objects, or any combinations thereof. An aggregator may combine each of the data/call streams into a combined data stream that represents a continuously increasing tally for or against participant "A". Similarly, the aggregator may combine each of the streams into a combined data stream that represents a continuously increasing tally for or against participant "B".

A processor may receive the combined data stream. In an embodiment, the processor may be associated with a device. The processor may be embedded within the device or may be a component of a computer system in communication with the device. The processor may process the combined data stream such that the device is at least partially controlled by the combined data stream. For example, the device may be a temperature control of a room at the site of the live event. The event participant "A" may be in the room. As the processor receives increasing votes or opinions that may be represented by the combined data stream, the temperature in the room may increase or decrease. In other examples, the device may be a noise generation device, a light generation device, a smoke/fog generation device or any other device that may be suitable to change the physical environment of participant "A". Other embodiments that are suitable to control the environment, circumstances, or situation occurring at the site of the live event concerning the participant "A" may be used consistent with the teachings of the present disclosure. For example, the device may be a counter or indicator that prompts a host of the performance to increase/decrease the difficulty of questions posed to the participant "A", allows the participant "A" to skip a challenge, and the like. In another embodiment, the device may be an indicator that prompts the host of the live event to activate a screen or monitor to interact directly with a virtual audience member via data and/or audio transmission in real-time.

Similarly, a processor may receive combined data streams. This processor may be associated with a device. The processor may process the combined data stream such that the device is at least partially controlled by the combined data stream.

In other embodiments, the processors may be associated with a single device that is at least partially controlled by the combined data streams.

Figure 2:
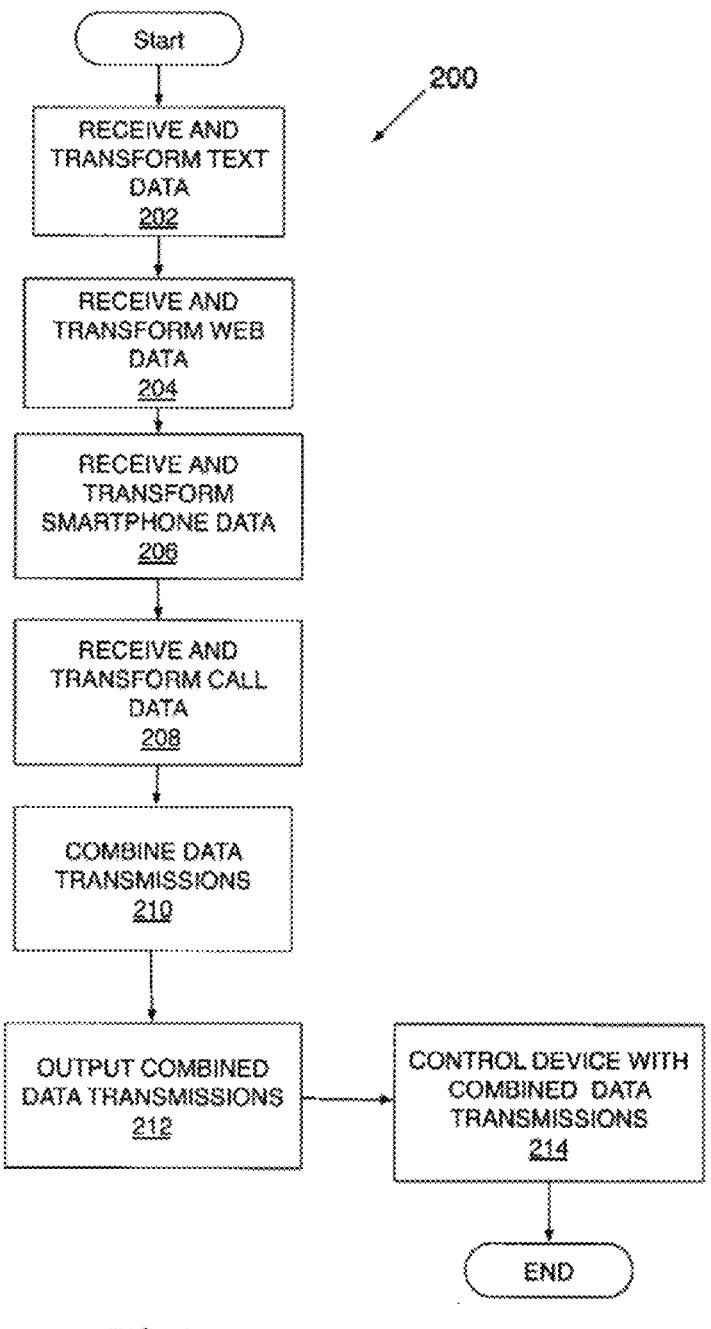
FIG. 2 is a flow diagram of a method for receiving data and audio transmissions from virtual audience members and retransmitting the related data and audio transmissions to provide a real-time digital virtual audience at a live event or performance according to an embodiment of the present disclosure.

FIG. 2 illustrates a flow diagram of method 200 for receiving data and audio transmissions from virtual audience members and retransmitting the related data and audio transmissions to provide a real-time digital virtual audience at a live event or performance. In a certain embodiment, some or all of the components represented in FIG. 1 may be employed in connection with this method. The method begins at steps 202-208 where data and/or audio streams are received and transformed. The data and/or audio streams may represent "votes" for a particular event participant or requests to enter the queue to interact with a particular event participant in real-time. The data and/or audio stream may be a collection of transmissions using a particular communication protocol. A web data stream may be received and transmitted at step 204. At step 206, a Smartphone data stream may be received and transmitted, and at step 208 a call stream may be received and transmitted. In certain embodiments, the transmission of the discrete votes communicated from the remote audience devices associated with virtual audience members may be accomplished by a processor or server, or a bank of data processors or servers, which may transmit each communicated vote into a running, increasing number stream, an increasing tally of votes for the respective communication protocol, or a queue for virtual audience members to interact with participants on site at the live event or otherwise connected with a virtual event/location, for example. Each of steps 202-208 may be carried out simultaneously.

Each of the streams received in steps 202-208 may be combined into a single combined data stream at step 210. An aggregator may be used to combine the separate data streams and create a combined data stream. A combined data stream may be communicated from the aggregator as an output in step 212. The combined data stream may represent a collection of votes received through different communication protocols for a particular event participant. At step 214, an electromechanical device associated with a particular participant may be controlled based at least partially on the combined data stream. For example, as the tally represented by the combined data stream increases, the temperature in a room where participant "A" is located may increase or decrease. Other devices may include lights, strobe lighting, digital display, lighted board, text board, digital display, computer, screen, cell phone, television, projector, speakers, water container, balloons, fireworks, fire, smoke, temperature controller, CD player, DVD player, other systems for distraction or physical change, and/or any combination thereof.

Figure 3:
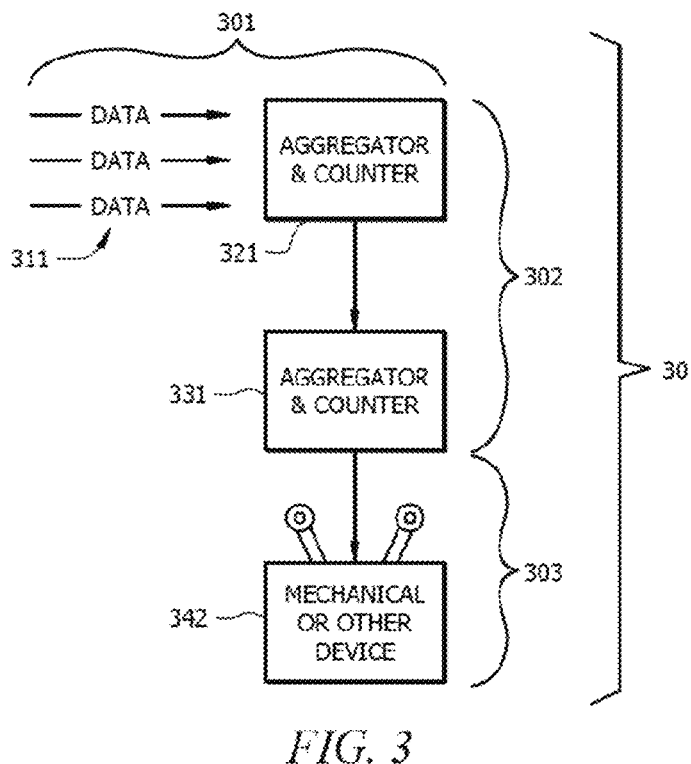
FIG. 3 is a flow diagram of a system and method of remote audience participation according to an embodiment of the present disclosure.

FIG. 3 is a flow diagram of a system and method of remote audience participation according to an embodiment of the present disclosure. In Phase A (301), data 311 may be sent into system 30 to remote audience participation (R.A.P.) aggregator and counter 321 according to an embodiment of the present disclosure. In Phase B (302), data 311 may be counted by R.A.P. aggregator and counter 321 and then be sent to second R.A.P. aggregator and counter 331 where data 311 may be combined with growing counts of other types of data such as data 312. In Phase C (303), the growing counts now combined into one large and rapidly growing count may be sent to mechanical device 342 or another processor or device that may cause device 342 to react, act, reveal a result, or perform other functions in response to data that it receives.

Figure 4:
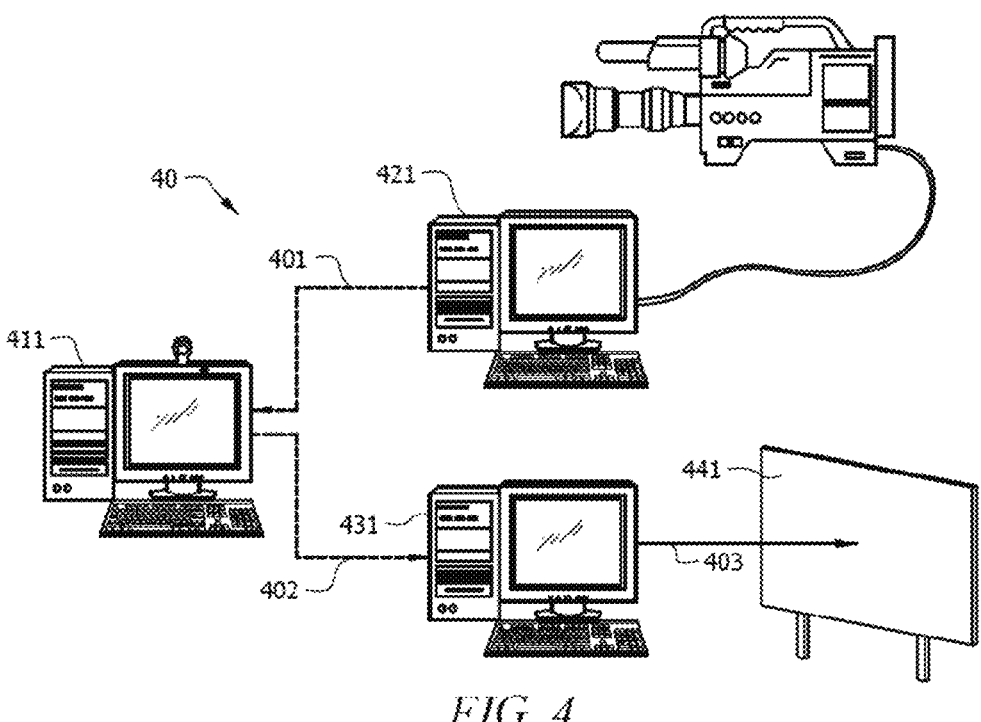
FIG. 4 is a flow diagram of a system and method of providing a virtual audience according to an embodiment of the present disclosure.

FIG. 4 is a flow diagram of a system and method of providing a virtual audience according to an embodiment of the present disclosure. In system 40, Phase A (401) a virtual audience member may turn on remote audience device 411 and begin transmitting/streaming from camera and/or computer bay 421 a live performance or event. In Phase B (402), a camera and/or microphone in remote audience device 411 may begin capture a virtual audience member's reactions to the streaming transmission/OTT and send that audio and/or video stream or capture to video/audio aggregator 431 that may be located on site at a live event or performance. In Phase C (403), video/audio aggregator 431 may accept an audio and/or video stream or capture from a virtual audience member and transmit that audio and/or video stream or capture onto board 441 that may be located on site at the live event or performance.

Figure 5:
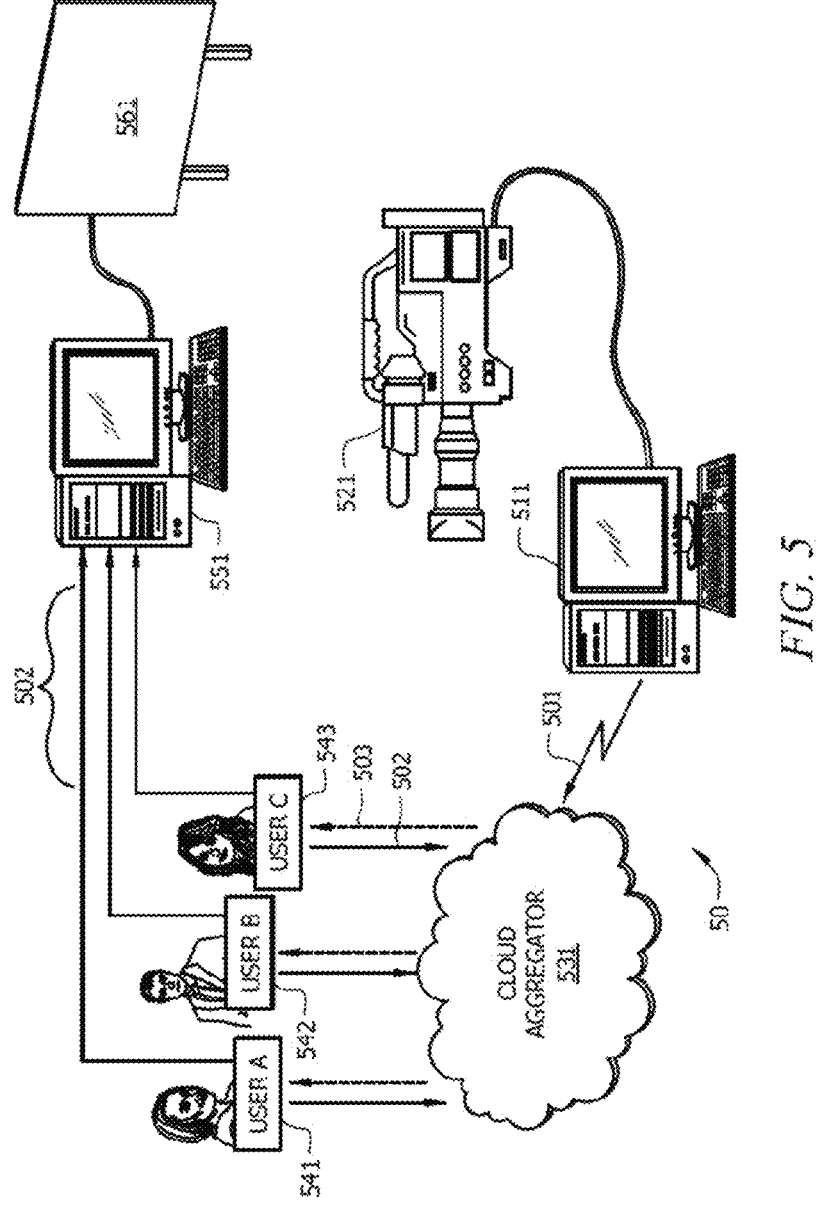
FIG. 5 is a flow diagram of a virtual ticket system and method according to an embodiment of the present disclosure.

FIG. 5 is a flow diagram of a virtual ticket system and method according to an embodiment of the present disclosure. In Phase I (501) of system 50, video transmission/OTT of a live event or performance may be sent from, for example, computer bay 511 and/or camera 521 to "cloud" aggregator 531. In Phase II (502), more than one virtual audience member (541, 542, 543) may log into "cloud" aggregator 531 to watch a live event or performance being transmitted from computer bay 511 and/or camera 521. Virtual audience members 541-543 may watch the same transmission/OTT of the live event or performance at the same time. Each virtual audience member also may transmit audio and/or video to "cloud" aggregator 531 and to video/audio aggregator bay 551 that may be on site at the live event or performance. In Phase III (503), "cloud" aggregator 531 may aggregate all incoming video streams and transmit them as a single stream. Video/audio aggregator bay 551 may transmit video and/or audio onto board 561 on site at the live event or performance.

Figure 6:
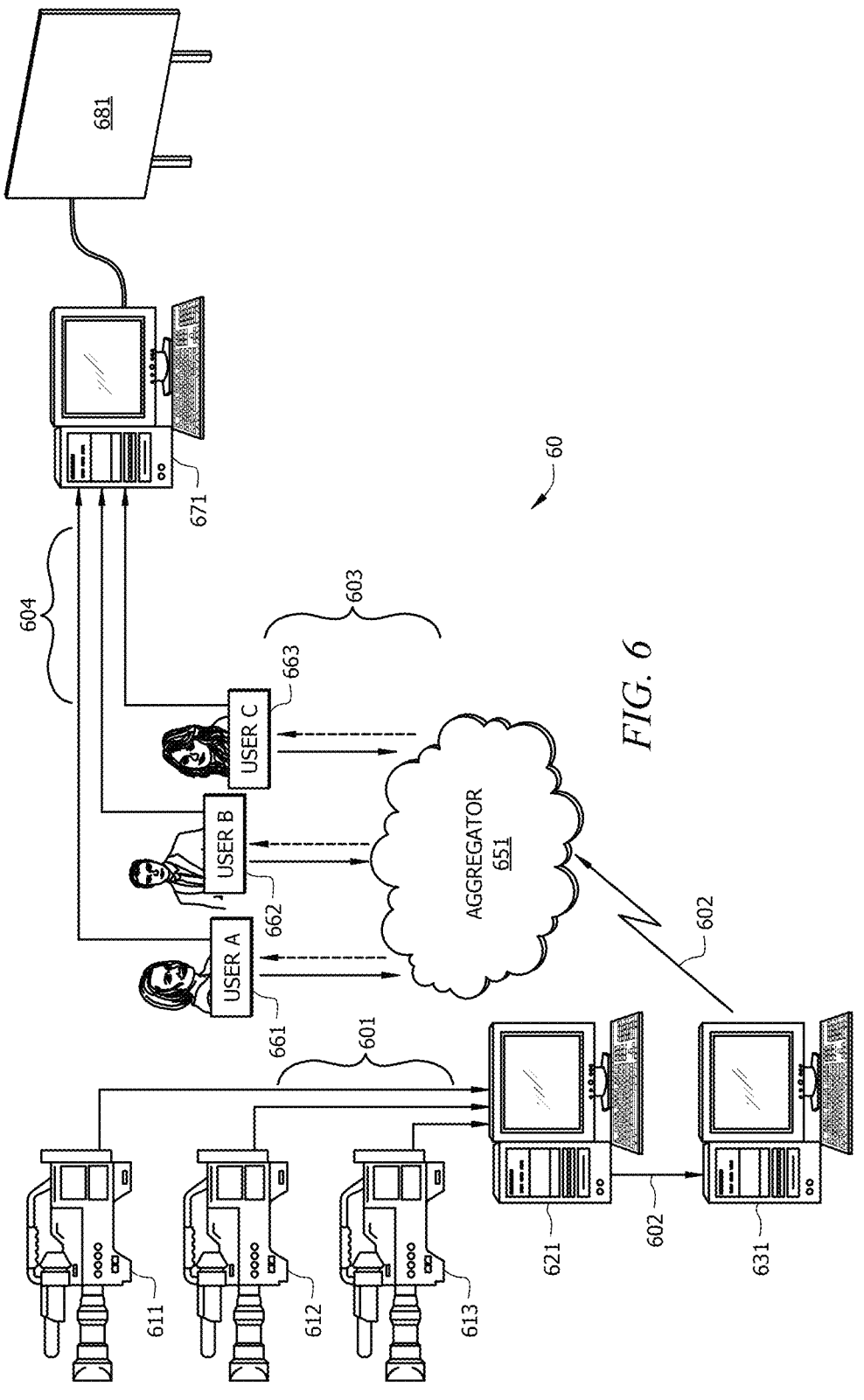
FIG. 6 is a flow diagram of a virtual ticket system and method according to an embodiment of the present disclosure.

FIG. 6 is a flow diagram of a virtual ticket system and method according to an embodiment of the present disclosure. In Part I (601), more than one camera feed/audio/video capturing device (611, 612) may be compiled and processed by data analyzing computer bay 621. In Part II (602), processed data from data analyzing computer bay 621 may then be structured into 3D rendered models of what was initially filmed by 3D modeling and rendering computer bay 631, if applicable. Transmission 641 of the structured 3D rendered model may be transmittedt into "cloud" 651. At least one virtual audience member (661, 662, 663) may log into "cloud" 651 in Part III (603) in order to see transmission 641 and streams from other virtual audience members (661, 662, 663) in "cloud" 651. Streams from at least one virtual audience member (661-663) also may be streamed to video and/or audio aggregator 671 that may be transmittedt onto board 681 on site at the live event or performance. Accordingly, virtual audience members (661-663) may see and explore various transmission/OTT streams from the live event or performance as well as from other virtual audience members through a single vantage point or coordinate. Further, a virtual audience member's audio and/or video may be transmitted to "cloud" 651 as well as to video and/or audio aggregator 671 on site at the live event or performance.

In an embodiment of the present disclosure, a customer may purchase a ticket from a ticket organization, league, company, promoter, or other entity. This ticket may be good for a designated seat or a general location at an event. This seat or location can be for one person or shared by more than one person in embodiments of the present disclosure. While some tickets may be sold, it should be appreciated that there may be embodiments of the present disclosure where tickets may be provided at no charge. As described herein, the availability of a seat may be limited to one or may be unlimited depending on what the entity putting on the event decides to make available. Tickets may be available for an event when there is no live audience, a partial live audience, or even a sold-out audience in embodiments of the present disclosure. Also, as described herein, persons may form groups of two or more and see each other while viewing the event, such as through picture-in-picture, and talk with one another as if they were sitting next to each other at the venue where the event is taking place.

Figure 7:
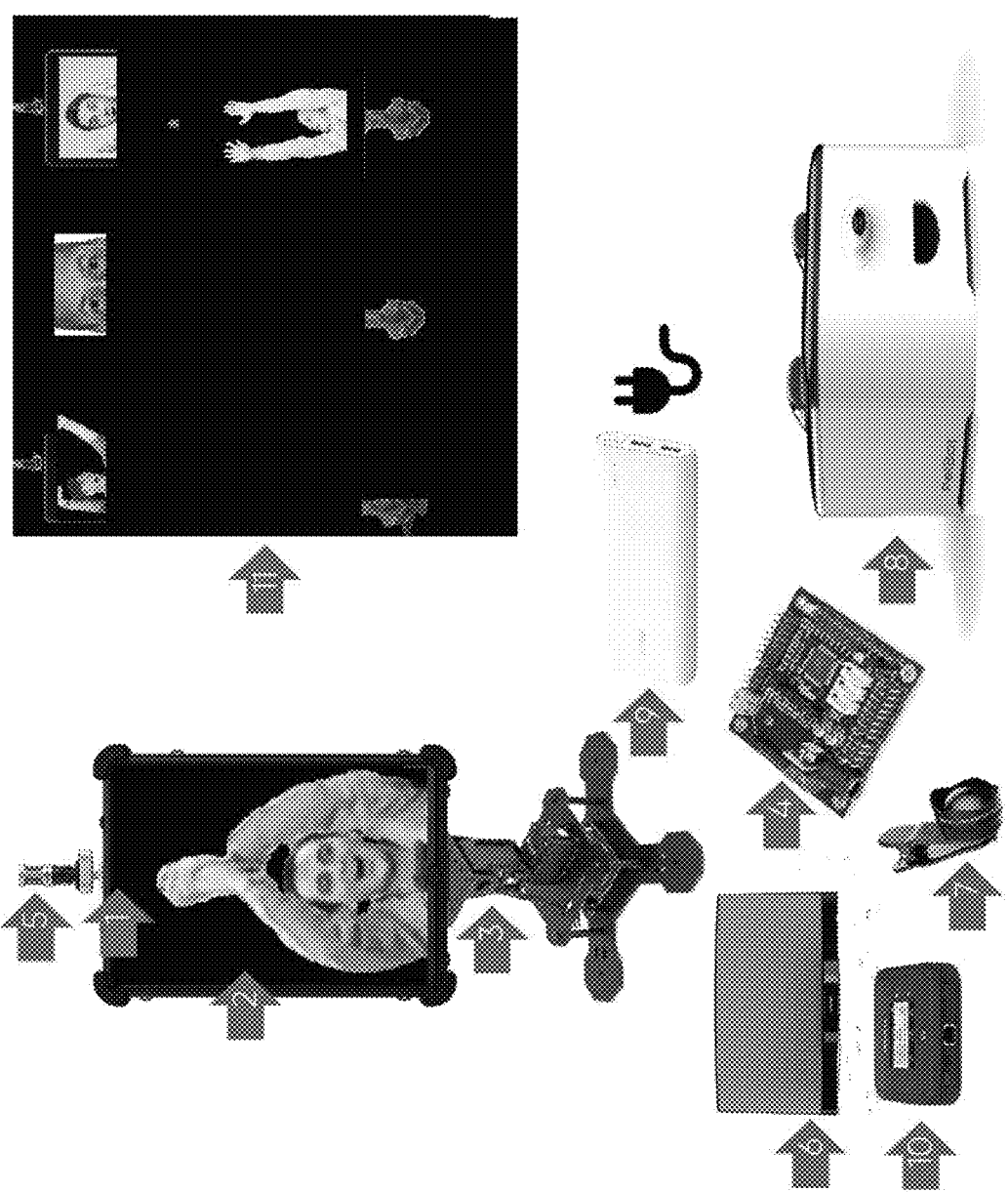
FIG. 7 depicts a system for a virtual ticket purchase for a designated seat according to an embodiment of the present disclosure.

FIG. 7 depicts components of a unit comprising a system and method to send and receive live visual and audio streams from and to virtual designated locations by means of purchasing or acquiring a virtual ticket according to an embodiment of the present disclosure, and depicts a system and method for a virtual ticket purchase for a designated seat according to an embodiment of the present disclosure. Tablet 2 (or other similar technology) may include a screen and camera 1 mounted or otherwise attached to robotic base/neck extension 3. Tablet 2 also may include external microphone 5 that may be mounted on top or otherwise attached around tablet 2. While the system is described as including a tablet with a camera and screen, it should be appreciated that a camera and a screen may be provided in forms other than a tablet without departing from the present disclosure. It also should be appreciated that the camera and screen may be integrated with one another or separately provided without departing from the present disclosure. External speaker 6 also may be provided, and it may be attached to tablet 2, the screen, and/or camera, either separately or in conjunction with one another, or may be wirelessly communicable with tablet 2, the screen, and/or camera, either separately or in conjunction with one another, in embodiments of the present disclosure. Similarly, external lens 7 may be provided. As depicted herein, arena or venue seat 11 may receive tablet 2, camera, and/or screen and robotic base/neck apparatus 3. In embodiments of the present disclosure, tablet 2, camera, and/or screen and robotic base/neck apparatus may be placed onto or around arena or venue seat 11. The system may further include controller 4, which may be an Arduino or other similar technology, housing 8, rechargeable battery or other power supply 9, and Wi-Fi router 10.

Controller 4 may control tablet 2 and/or robotic base/neck apparatus 3 so that they may rotate or adjust position, including but not limited to, a 360-degree rotation. It should be appreciated that the rotation or adjustment may be continuous or incremental in embodiments of the present disclosure. In an example, controller 4 may turn tablet 2 for a first customer to face tablet 2 associated with a second customer so that the customers may see each other and speak with one another as if physically present in the venue or at the event. In such example, each tablet (or screen and/or camera) may have a separate controller so that they may act independently from one another.

Housing 8 may be provided to cover or protect tablet 2, camera, screen, and/or other components of the system in embodiments where the system may be used outdoors or indoors (such as to protect from being damaged due to flying objects). In some embodiments of the present disclosure, housing 8 may be provided to transform the system into an integrated system wherein each component is contained within housing 8. This may be desirable for installation and transportation purposes. It should be appreciated that housing 8 may provide a protective enclosure but may be provided in various forms, including, but not limited to, in a single housing or even in the form of a robot.

In the embodiment depicted in FIG. 7, the number of units, which may include at least a camera and a screen and may come in the form of a tablet, such as tablets 2, may be equal to the number of seats available in the arena or venue or may be a subset thereof. A unit, which may be in the form of tablet 2 in an embodiment of the present disclosure, may be placed at a designated seat location. It may be freestanding, attached to the seat itself, and/or affixed to a support structure close to the seat, and/or hovering close to the seat. Using the system of FIG. 7, a customer purchases or otherwise acquires a ticket for a designated seat at an event (example: seat 1A) and is given a seat locator code. The customer may be instructed to proceed to a URL where he/she uses the seat locator code to access the system. The code may only be valid for one user. At the seat, the unit's microphone may pick up the ambient sound (event sound) surrounding the seat and the unit's camera, which may be in a tablet according to an embodiment of the present disclosure, sees the view from the designated seat perspective. The seat sound and view may be sent (or streamed) over Wi-Fi or other wireless technology to a video conferencing "cloud" platform. From the cloud platform, the seat sound and view may be sent (or streamed) to a URL where the customer may access the system with his/her seat locator code via their mobile device or computer. The customer can then do one or more of the following: direct the controlling device to move the camera view (left, right, point, tilt, zoom) providing his/her own life-like event visual experience; send his/her picture (still, avatar, or live video) via his/her computer or mobile device back to the cloud platform; send his/her voice via his/her computer or mobile device back to the cloud; and stream his/her voice and picture (still, avatar, or live video) through the video conferencing cloud back to the unit at the event. The customer's picture can be seen on the screen, which may be provided in a tablet in an embodiment of the present disclosure, and his/her voice can be heard through the seat unit's speaker thus creating a real live audience at the event. The picture can also be seen if desired on a video wall or screen at the event and the voice can be mixed with other voices to create an even bigger full event sound. The customer can opt out of sending back his/her voice and picture if so desired.

A second customer may purchase or acquire a seat (1B) next to (1A) and be given his/her own seat locator code and via a URL access an identical but separate system from the one described above. The seat's surrounding sound and camera view may be streamed to a video conferencing cloud where the customer can access it through a URL with his/her locator seat code. The customer is then able to direct the controlling device to move the camera view (left, right, point, tilt, zoom) providing a life like event visual experience. The customer's voice and picture (still, avatar, or live video) via his computer or mobile device can then be streamed back to the video conferencing cloud where it is streamed back to the seat unit to be seen and heard by others who have made similar ticket purchases.

At the same time, the two friends can conference with each other, although it should be appreciated that each friend can manipulate his/her own camera as soon as they access the system using the locator seat code. A picture in picture feature of each friend is available on their respective computer or mobile device. Paying customers may determine who is in their conference of friends. When the picture and sound from customers (friends) is received by the units at the event, the customers via their respective computer or mobile device can direct the controlling device to pivot their own unit and camera angle perspective to look at each other and talk to each other, fan to fan, screen to screen, and be with other fans actually at the event. However, it should be appreciated that manipulation of the unit is not dependent on receiving picture and/or sound from friends. For the team or talent, they can hear the roar of the crowd, see the faces and experience the game with their loyal fans.

Figure 8:
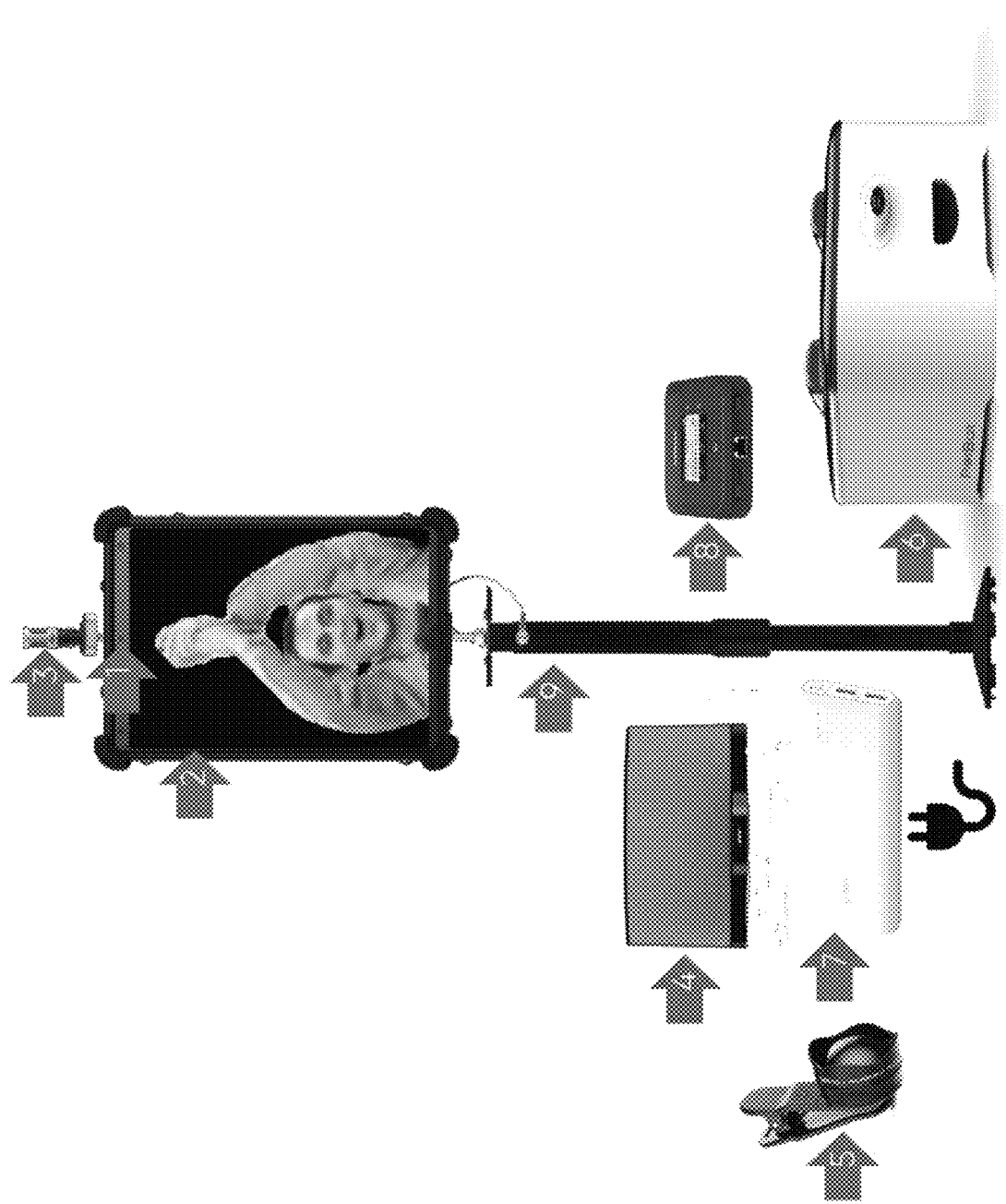
FIG. 8 depicts a system for a virtual ticket purchase for a shared general location according to an embodiment of the present disclosure.

FIG. 8 depicts components of a unit comprising a system and method to send and receive live visual and audio streams from and to virtual designated and/or shared locations by means of purchasing or acquiring a virtual ticket according to an embodiment of the present disclosure and depicts a system and method for a virtual ticket purchase (or acquisition) for a shared general location according to an embodiment of the present disclosure. The system may include tablet 2 which may include camera 1 and a screen; however, as discussed with respect to FIG. 7, the camera and screen may be separate parts of the unit (i.e., not necessarily part of a tablet) in embodiments of the present disclosure. Tablet 2 may be affixed or otherwise attached to supporting apparatus 9; however, there may be embodiments of the present disclosure where the components are configured within a single housing or otherwise integrated, such as in the form of a robot. The system also may include external microphone 3 and/or external speaker 4 and/or external lens 5 in embodiments of the present disclosure. Housing 6 may be provided for reasons similar to those described with respect to FIG. 7. The system also may include rechargeable battery or power supply 7 and Wi-Fi router 8, which may control movement of tablet 2 and/or supporting apparatus 9 as described with respect to FIG. 7. It should be appreciated that tablet 2 and other components of the system may be free-standing, affixed to a support structure, and/or hovering over a seat in embodiments of the present disclosure.

To use the system depicted in FIG. 8, a customer purchases or otherwise acquires a ticket for a general location at an event (example: in front of stage) and may be given a general location locator code. The customer may be instructed to proceed to a URL where he/she uses the general location locator code to access the system. The code is only valid for one user in an embodiment of the present disclosure. At the general location, the system may pick up the ambient sound (event sound) surrounding the seat, and the unit's camera/tablet may capture the view from the general location perspective. The location sound and view may be sent (or streamed) via Wi-Fi to a video conferencing cloud platform. From the cloud, the location sound and view may be sent (streamed) to a URL where the customer accesses the system with his/her general location locator code via their mobile device or computer. The customer can then do one or more of the following: send his/her picture (still, avatar, or live video) via his/her computer or mobile device back to the cloud; send his/her voice via his/her computer or mobile device back to the cloud; and/or stream his/her voice and picture through the cloud back to the event. The customer's picture can be seen on a video wall or screen at the event and the voice can be mixed with other voices to create an even bigger full event sound. The customer can opt out of sending back his/her voice and picture if so desired.

In an embodiment of the present disclosure, a second customer purchases or acquires a general location ticket and is given his/her own general location locator code and via a URL (or other similar means of connection) accesses an identical but separate system from the one described above. The location's surrounding sound and camera view may be streamed to a video conferencing cloud where the customer can access it through a URL with his/her general location locator code. The customer's voice and picture (still, avatar, or live video) via his computer or mobile device can then be streamed back to the video conferencing cloud where it is streamed back to event and can be seen and heard by others who have made like ticket purchases. At the same time the two friends can conference with each other. A picture in picture feature of each friend may be available on their respective computer or mobile device. Paying customers determine who is in their conference of friends. When the picture and sound from customers (friends) is received at the event, the customers via their respective computer or mobile device can be with other fans actually at the event when it might not otherwise had been possible or available. For the team or talent, they can hear the roar of the crowd, see the faces and experience the game with their loyal fans.

Figure 9:
FIG. 9 depicts a plurality of units that may allow virtual audience members to talk with other virtual audience members online or other live event attendees in the venue according to an embodiment of the present disclosure.
Figure 11:
FIG. 11 depicts how a virtual audience member may build his/her own fan group using a system according to embodiments of the present disclosure.

FIG. 9 depicts a plurality of units that may allow virtual audience members to talk with other virtual audience members online or other live event attendees in the venue. FIG. 11 depicts how a virtual audience member may build his/her own fan group using a system according to embodiments of the present disclosure. Accordingly, a virtual audience member may socialize before, during, and/or after events.

If a virtual audience member is not able to join an event as it is taking place live, the virtual audience member may still gain access to the events on demand, replay favorite events, and retrieve past events. It should be appreciated that on-demand access may be provided from an archive housed in the cloud in an embodiment of the present disclosure. Accordingly, the virtual audience member may watch (or re-watch) the event from the vantage point that he/she obtained access to in embodiments of the present disclosure.

Figure 10:
FIG. 10 depicts a screen shot of on-screen applications that may be provided as part of a virtual experience in embodiments of the present disclosure.

In some embodiments of the present disclosure, on-screen applications may be provided to allow a virtual audience member to have a more personalized experience. For example, FIG. 10 depicts a screen shot of on-screen applications that may be provided as part of a virtual experience in embodiments of the present disclosure. Accordingly, the on-screen applications may be used without leaving the virtual experience (i.e., in-system use of third-party applications).

Multi-viewer access also may be provided in embodiments of the present disclosure. For example, a user may bring others along with him/her, and additional fees may be assessed to add other users; however, if there are others associated with the user, there may be embodiments of the present disclosure where control of the virtual experience may be shifted from the user to one or more of the others associated with the user.

There may be embodiments of the present disclosure where subscription services may be provided in addition to or in place of systems discussed herein. For example, an artificial intelligence (AI)-driven solution may be used in sports to isolate selected players for coaches and athletic directors to evaluate future team prospects. Simultaneous on-demand multi-screen playback solutions also may be provided allowing coaches to breakdown games (i.e., film room). An AI-supported solution may be provided for teams and coaches to scout upcoming opponents and players without the need for travel. It should be appreciated that such an AI-driven solution may be automatic or activated by prompt in embodiments of the present disclosure.

Some of the steps illustrated in FIGS. 2-11 may be combined, modified, or deleted where appropriate, and additional steps may also be added to the flow diagram. Additionally, steps may be performed in any suitable order without departing from the scope of the disclosure. It also should be appreciated that digital twinning may be employed without departing from the present disclosure.

It should be appreciated that the real-time digital virtual audience system and method according to embodiments of the present disclosure may be paid for by individuals as if they were purchasing a ticket on a per transmission/broadcast basis, subscription basis, through a license, or virtual access may be offered free of charge. In other embodiments, the system and method may be offered to other collective bodies on a per transmission/broadcast basis, subscription basis, on a licensing fee basis, or offered free of charge.

While the system and method according to embodiments of the present disclosure have been described largely in the context of entertainment and sports, it should be appreciated that other markets and uses may be provided including, but not limited to, corporate events and trade shows, government, religious events, international, reality television, and/or watch parties. Accordingly, the system and method according to embodiments of the present disclosure may provide expanded venue capacity, virtual fan attendance, fan engagement, gamification, and interaction, live and on-demand pricing, safe and secure mobile or in-home viewing, and/or new ticket and advertising revenues to schools, venues, and/or teams.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations, and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure and the following claims.

The invention claimed is:

1. For use in conjunction with an event, a method for a virtual audience member to participate in a real-time digital virtual audience comprising:

obtaining virtual access to the event, the virtual access associated with a designated seat or location at the event;

selecting a link or a quick response (QR) code using a communication device to receive a locator code to access sound and a view associated with the designated seat or location at the event;

receiving the sound and the view associated with the designated seat or location transmitted to a video cloud platform over a wireless communication network, the sound and the view including selectively providing the virtual audience member with a particular vantage point within the event that is configured to be manipulated by the virtual audience member through the communication device; and wherein the sound and view are formed by:

processing video associated with the event to produce a corresponding data stream;

combining said corresponding data stream with one or more individual data streams associated with the event, the virtual audience member, or other virtual audience members; and displaying audio and video associated with the corresponding data stream and the one or more individual data streams in real-time to the virtual audience member.

2. The method of claim 1, wherein the virtual audience member manipulates the particular vantage point by performing at least one of the following functions:

turning right, turning left, and zooming in on one or more objects associated with the event.

3. The method of claim 1, wherein the communication device is selected from the group comprising:

personal computer, a laptop computer, a Web-enabled mobile device, or any suitable communication device/system with access to the Internet or other communication network.

4. The method of claim 1 further comprising:

sending a picture of the virtual audience member via the communication device to the video cloud platform.

5. The method of claim 4, wherein the picture is a still picture, an avatar, and/or a live video.

6. The method of claim 4, wherein the picture is seen and/or heard at the event.

7. The method of claim 1 further comprising:

sending sound from the virtual audience member to the video cloud platform to be transmitted to the event.

8. The method of claim 1 further comprising:

communicating video and/or audio through the communication device with at least one additional virtual audience member through the communication network accessing at least one additional locator code associated with at least one other designated seat or location at the event, the at least one other designated seat or location located next to or around the designated seat.

9. The method of claim 8, wherein communicating video and/or audio through the communication device with at least one additional virtual audience member is through a picture-in-picture feature on the communication device.

10. The method of claim 8, wherein communicating video and/or audio through the communication device with at least one additional virtual audience member is by pivoting one or more of their respective vantage points to communicate with one another.

11. The method of claim 8, wherein communicating video and/or audio through the communication device with at least one additional virtual audience member is by tilting the communication device.

12. For use in conjunction with an event, a method for a virtual audience member to participate in a real-time digital virtual audience comprising:

obtaining virtual access to the event, the virtual access associated with a general location at the event;

selecting a link or a quick response (QR) code using a communication device to receive a locator code to access sound and a view associated with a general location at the event;

receiving the sound and the view associated with the general location transmitted to a video cloud platform over a wireless communication network, the sound and the view including selectively providing the virtual audience member with a particular vantage point within the event that is capable of being manipulated by the virtual audience member through the communication device; and wherein the sound and view are formed by:

processing video associated with the event to produce a corresponding data stream;

combining said corresponding data stream with one or more individual data streams associated with the event, the virtual audience member, or other virtual audience members; and displaying audio and video associated with the corresponding data stream and the one or more individual data streams in real-time to the virtual audience member.

13. The method of claim 12, wherein the communication device is selected from the group comprising:

personal computer, a laptop computer, a Web-enabled mobile device, or any suitable communication device/ system with access to the Internet or other communication network.

14. The method of claim 12 further comprising:

sending a picture of the virtual audience member via the communication device to the video cloud platform.

15. The method of claim 14, wherein the picture is a still picture, an avatar, and/or a live video.

16. The method of claim 14, wherein the picture is seen and/or heard at the event.

17. The method of claim 12 further comprising:

sending sound from the virtual audience member to the video cloud platform to be transmitted to the event.

18. The method of claim 12, wherein communicating through the communication device with at least one additional virtual audience member is through a picture-in-picture feature on the communication device.

19. The method of claim 12 further comprising:

communicating through the communication device with at least one additional virtual audience member through the communication network accessing at least one additional locator code associated with the general location at the event.

\* \* \* \* \*